US008253881B2

(12) United States Patent
Chiang et al.

(10) Patent No.: US 8,253,881 B2
(45) Date of Patent: Aug. 28, 2012

(54) ATTACHMENT FRAME FOR A DISPLAY MODULE AND PORTABLE ELECTRONIC DEVICE USING THE SAME

(75) Inventors: Chih-Liang Chiang, Tu-Cheng (TW); Bin Dai, Shenzhen (CN); Fa-Guang Shi, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 118 days.

(21) Appl. No.: 12/961,697

(22) Filed: Dec. 7, 2010

(65) Prior Publication Data

US 2012/0044436 A1 Feb. 23, 2012

(30) Foreign Application Priority Data

Aug. 18, 2010 (CN) .......................... 2010 1 0256323

(51) Int. Cl.
*G02F 1/1333* (2006.01)

(52) U.S. Cl. ....................................................... 349/58

(58) Field of Classification Search ...................... 349/58
See application file for complete search history.

(56) References Cited

U.S. PATENT DOCUMENTS

| 6,828,721 | B2 * | 12/2004 | Wakita ............................ 313/491 |
| 7,304,837 | B2 * | 12/2007 | Lo et al. ..................... 361/679.27 |
| 7,492,421 | B1 * | 2/2009 | Kim et al. ........................ 349/58 |
| 7,518,671 | B2 * | 4/2009 | Maruta ............................ 349/58 |
| 2008/0192168 | A1 * | 8/2008 | Sudo ............................... 349/58 |
| 2009/0122221 | A1 * | 5/2009 | Lee ................................. 349/58 |
| 2009/0237586 | A1 * | 9/2009 | Han et al. ....................... 349/58 |
| 2010/0315769 | A1 * | 12/2010 | Mathew et al. ........... 361/679.29 |

* cited by examiner

*Primary Examiner* — Wen-Ying P Chen
(74) *Attorney, Agent, or Firm* — Altis Law Group, Inc.

(57) ABSTRACT

An attachment frame for a display module includes a bezel attaching to the display module and at least one pair of tabs positioned on the inner sides of the bezel. Each tab includes a fixing portion connected to the bezel, a mounting portion fixed to the display module, and a connecting portion connecting the fixing portion and the mounting portion. Each tab forms a plurality of first strengthening ribs extending from the connecting portion to the mounting portion and a plurality of second strengthening ribs extending from the connecting portion to the fixing portion.

15 Claims, 5 Drawing Sheets

ATTACHMENT FRAME FOR A DISPLAY MODULE AND PORTABLE ELECTRONIC DEVICE USING THE SAME

CROSS-REFERENCE TO RELATED APPLICATION

This application is related to two co-pending U.S. patent applications, Ser. Nos. 12/961,695 and 12/961,701 and both entitled "ATTACHMENT FRAME FOR A DISPLAY MODULE AND PORTABLE ELECTRONIC DEVICE USING THE SAME". The inventor of the above co-pending applications is Bin Dai et al. The co-pending applications have the same assignee as the present application. The disclosures of the above-identified applications are incorporated herein by reference.

BACKGROUND

1. Technical Field

The present disclosure generally relates to an attachment frame for a display module such as a liquid crystal panel in a portable electronic device, and also relates to a portable electronic device, such as a tablet computer, using the attachment frame.

2. Description of the Related Art

As a result of increased demand for reduced portable electronic device size and improvements in performance of such devices, reduction of the external dimensions of such devices along with increased display area have been major priorities in device development. Such demand is particularly prevalent in smaller portable electronic devices using liquid crystal panels, including tablet computers.

Liquid crystal panels are often mounted in a housing of a tablet computer by a bracket. The bracket includes a main connecting part and a plurality of tabs extending from the periphery thereof. The main connecting part and the tabs define a plurality of first mounting holes, and the display and the housing define a plurality of second mounting holes corresponding thereto. The liquid crystal panel, the bracket, and the housing are fixed together by a plurality of fasteners received in the corresponding first and second mounting holes. However, in order to minimize the amount of space used, the bracket is generally smaller and thinner with inferior mechanical strength. When the electronic device is impacted by an external force or shock, accordingly, the bracket will be damaged and thus the electronic device cannot work properly.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
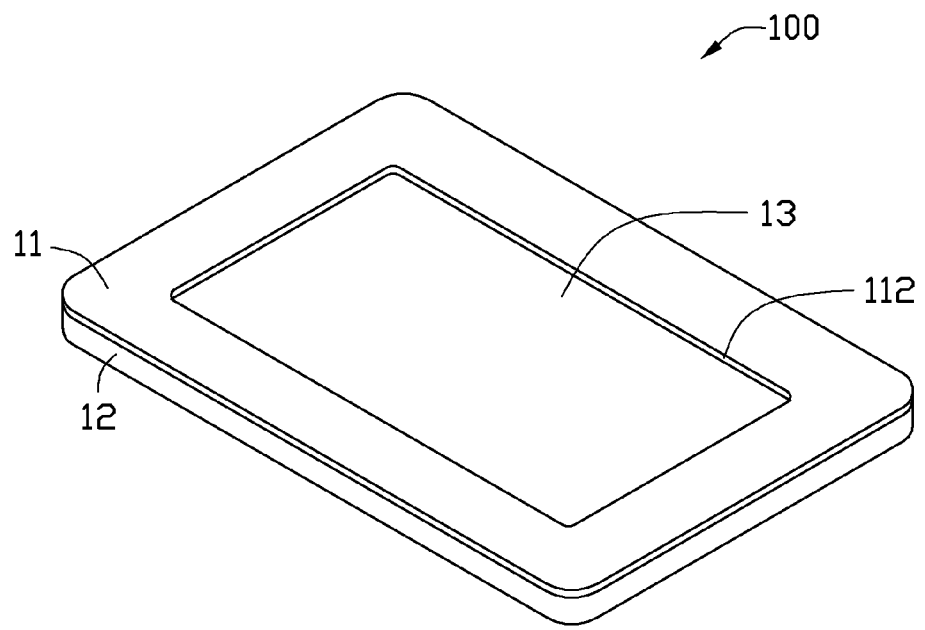
FIG. 1 is an assembled, isometric view of an embodiment of a portable electronic device including a bezel, a rear cover, a display module, and an attachment frame.
Figure 2:
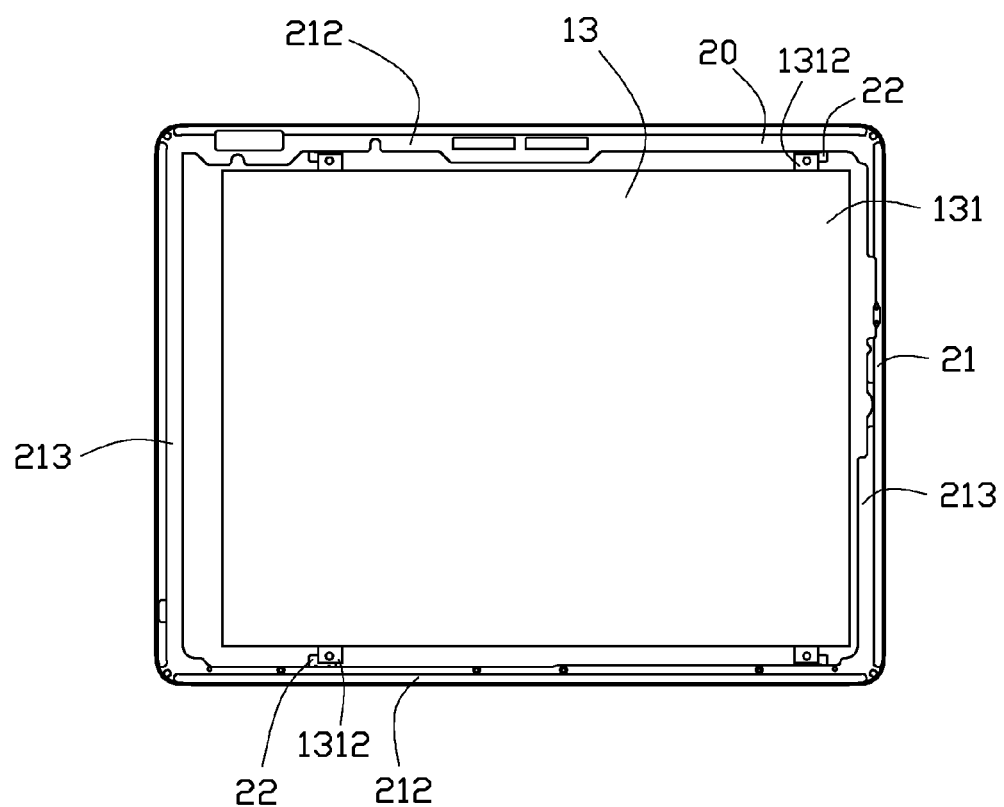
FIG. 2 is a plan view of the display module and the attachment frame of FIG. 1, with the bezel not shown.
Figure 3:
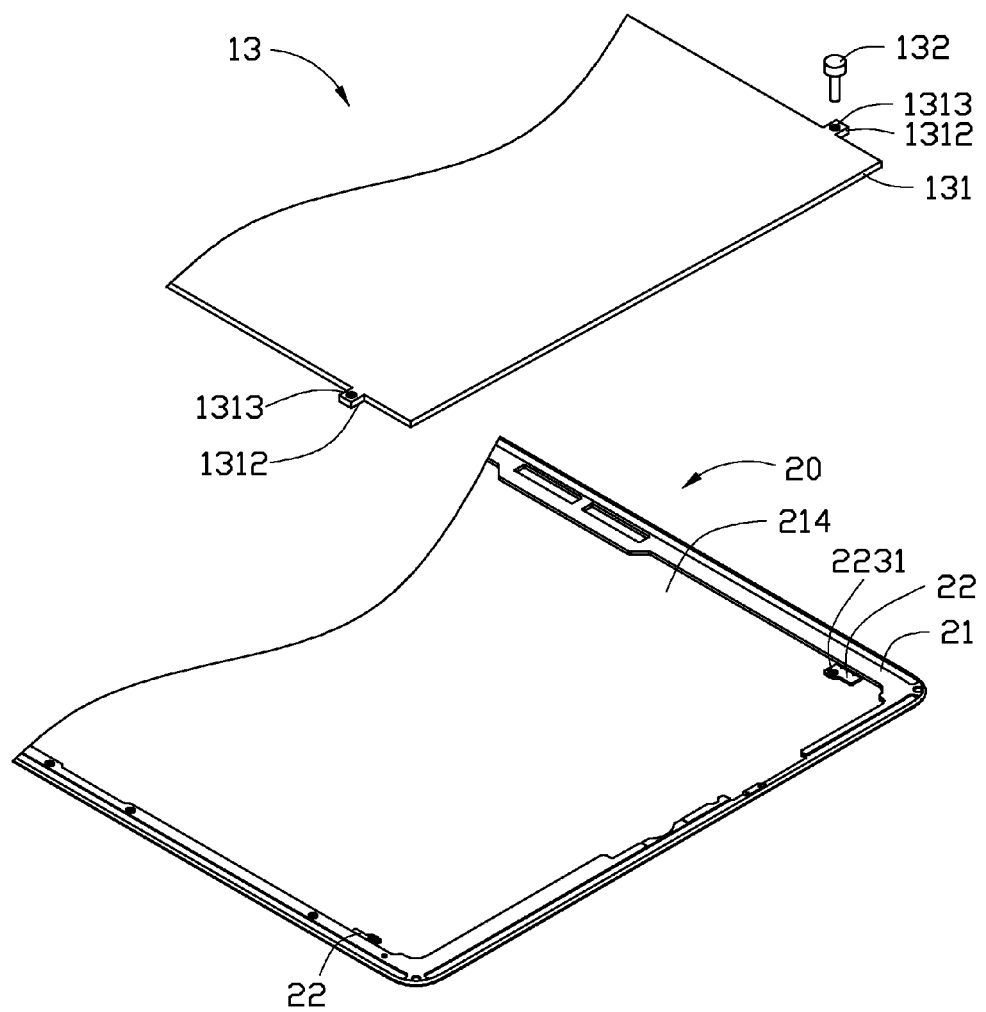
FIG. 3 is a partial, exploded, isometric view of the display module and the attachment frame of FIG. 2.

Referring to FIGS. 1 through 3, one embodiment of a portable electronic device 100 is a tablet computer including a first bezel 11, a rear cover 12, a display module 13, and an attachment frame 20 for attaching the display module 13 to the rear cover 12.

The first bezel 11 is substantially rectangular and defines a rectangular opening 112 for the display module 13. The first bezel 11 is fixed to the rear cover 12 in such a manner that the first bezel 11 and the rear cover 12 cooperatively define a receiving chamber (not labeled) therebetween to receive the display module 13.

The display module 13 includes a liquid display panel (not shown), a light guide plate (not shown), a light reflection plate (not shown), a light diffusion plate (not shown), and an outer frame 131 securing the foregoing components. The outer frame 131 includes four protruding portions 1312 extending from the periphery thereof. Each protruding portion 1312 defines a first mounting hole 1313.

Figure 4:
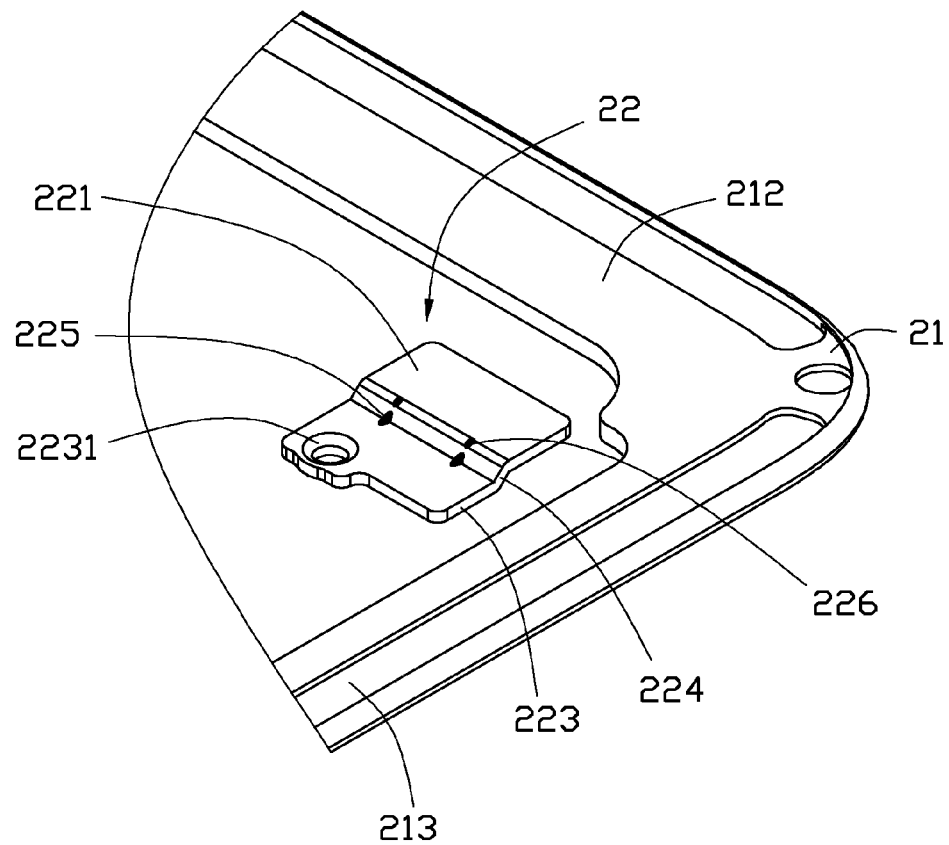
FIG. 4 is a partial, isometric view of one embodiment of an attachment frame, such as, for example, the attachment frame in FIG. 2.
Figure 5:
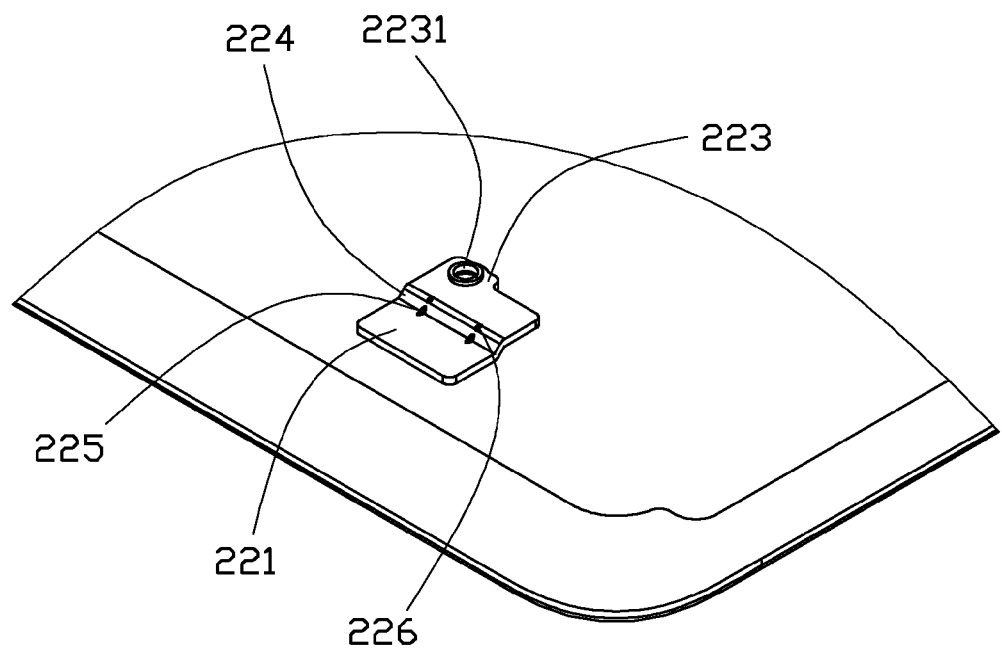
FIG. 5 is similar to FIG. 4, but viewed from another aspect.

Referring also to FIGS. 4 and 5, the attachment frame 20 includes a second bezel 21 fixed to the rear cover 12 and two pairs of tabs 22. The attachment frame 20 attaches the display module 13 to the rear cover 12 and positions the display module 13 in the receiving chamber.

The second bezel 21, fixed to the rear cover 12, is substantially rectangular and includes a plurality of opposite first sidewalls 212 and a plurality of opposite second sidewalls 213. The first and second sidewalls 212, 213 cooperatively define a receiving bay 214. The receiving bay 214 has dimensions exceeding those of the display module 13, and allowing accommodation thereof. The tabs 22 are formed on the inner sides of the first sidewalls 212.

The tabs 22 cooperatively support the display module 13. Each tab 22 includes a fixing portion 221 fixed to the second bezel 21, a mounting portion 223 fixed to the display module 13, and a connecting portion 224 connecting the fixing portion 221 and the mounting portion 223. The connecting portion 224 curves inward from the inner side of the second bezel 21. Each tab 22 further forms a pair of first strengthening ribs 225 extending from the connecting portion 224 to the mounting portion 223 and a pair of second strengthening ribs 226 extending from the connecting portion 224 to the fixing portion 221.

The strengthening ribs 225, 226 can be formed by stamping. During the stamping process, a plurality of protrusion structures with shapes and sizes corresponding to that of the strengthening ribs 225, 226 are formed on the punch pin of a mold which is used to form the tabs 22. The number of strengthening ribs 225, 226 can vary. It should be understood that the attachment frame 20 can form either, or both, of the first strengthening ribs 225 and the second strengthening ribs 226.

In this illustrated embodiment, the fixing portion 221 is substantially flat and parallel to the mounting portion 223 and the second bezel 21, and the connecting portion 224 is angled to the mounting portion 223. The fixing portion 221 is fixed to the bottom surface of the first sidewall 212 by any known means such as welding, fastening or the like.

The mounting portion 223 defines a second mounting hole 2231 corresponding to the first mounting holes 1313 of the protruding portions 1312. The display module 13 is received in the receiving bay 214, and a plurality of fasteners 132 pass through the corresponding first and second mounting holes 1313, 2231 to be engaged in the tabs 22, thus fixing the attachment frame 20 to the rear cover 12. It should be understood that the mounting portion 223 also can be fixed to the display module 13 by other means, for example, by means of a plurality of assembly holes defined in the display module and a plurality of pins formed on the mounting portions and received in the corresponding assembly holes to fix the tabs 22 to the display module 13.

By utilizing the first and second strengthening ribs 225, 226, the attachment frame 20 as disclosed can provide significant amount of mechanical strength without occupying additional space, so that the size of the electronic device 100 can be minimized.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An attachment frame for a display module, the attachment frame comprising:
   a bezel arranged in a periphery of the display module; and
   at least one pair of tabs positioned on a plurality of inner sides of the bezel, each tab comprising a fixing portion connected to the bezel, a mounting portion fixed to the display module, and a connecting portion connecting the fixing portion and the mounting portion, wherein each tab forms at least one strengthening rib extending from the connecting portion to the fixing portion and/or the mounting portion.

2. The attachment frame of claim 1, wherein the at least one strengthening rib is formed by stamping.

3. The attachment frame of claim 1, wherein the at least one strengthening rib comprises a pair of first strengthening ribs extending from the connecting portion to the mounting portion and a pair of second strengthening ribs extending from the connecting portion to the fixing portion.

4. The attachment frame of claim 1, wherein the mounting portion is substantially flat and parallel to the fixing portion, and the connecting portion is angled to the mounting portion.

5. The attachment frame of claim 1, wherein the connecting portion curves inward from the plurality of inner side of the bezel.

6. The attachment frame of claim 1, wherein the bezel is substantially rectangular and comprises a plurality of opposite first sidewalls and a plurality of opposite second sidewalls, and the first and second sidewalls cooperatively define a receiving bay to receive the display module.

7. The attachment frame of claim 6, wherein the at least one pair of tabs are formed on the plurality of inner sides of the first sidewalls.

8. The attachment frame of claim 6, wherein the fixing portion is fixed to the first sidewall of the bezel of the attachment frame by welding.

9. A portable electronic device comprising:
   a rear cover;
   a first bezel fixed to the rear cover and cooperatively defining a receiving chamber;
   a display module received in the receiving chamber; and
   an attachment frame for attaching the display module to the rear cover, the attachment frame comprising:
      a second bezel arranged in a periphery of the display module; and
      at least one pair of tabs positioned on a plurality of inner sides of the second bezel, each tab comprising a fixing portion connected to the second bezel, a mounting portion fixed to the display module, and a connecting portion connecting the fixing portion and the mounting portion, wherein each tab forms a plurality of first strengthening ribs extending from the connecting portion to the mounting portion and a plurality of second strengthening ribs extending from the connecting portion to the fixing portion.

10. The portable electronic device of claim 9, further comprising a plurality of fasteners, wherein the display module comprises an outer frame forming a plurality of protruding portions extending from a periphery thereof, each protruding portion defines a first mounting hole, the mounting portion defines a plurality of second mounting holes corresponding to the first mounting holes, and the plurality of fasteners are received in the corresponding first and second mounting holes to be engaged in the corresponding tab.

11. The portable electronic device of claim 10, wherein the plurality of first and second strengthening ribs are formed by stamping.

12. The portable electronic device of claim 9, wherein the mounting portion is substantially flat and parallel to the fixing portion, and the connecting portion is angled to the mounting portion.

13. The portable electronic device of claim 9, wherein the connecting portion curves inward from the inner side of the second bezel.

14. The portable electronic device of claim 9, wherein the second bezel is substantially rectangular and comprises a plurality of opposite first sidewalls and a plurality of opposite second sidewalls, and the first and second sidewalls cooperatively define a receiving bay to receive the display module.

15. The portable electronic device of claim 14, wherein the fixing portion is fixed to the first sidewall of the second bezel by welding.

* * * * *